United States Patent [19]

Esguerra et al.

[11] Patent Number: 5,544,834
[45] Date of Patent: Aug. 13, 1996

[54] VIDEO TAPE CASSETTE

[75] Inventors: Alfonso Esguerra; George Esguerra, both of Miami, Fla.

[73] Assignee: WTI International Corporation, Miami, Fla.

[21] Appl. No.: 286,824

[22] Filed: Aug. 5, 1994

Related U.S. Application Data

[63] Continuation-in-part of Ser. No. 120,791, Sep. 15, 1993, which is a continuation of Ser. No. 615,116, Nov. 19, 1990, abandoned.

[51] Int. Cl.$^6$ .................................................. G11B 23/87
[52] U.S. Cl. ................................. 242/347.1; 242/343.2; 242/345.2
[58] Field of Search ................................. 242/341, 343, 242/343.2, 345.2, 346, 346.2, 347, 347.1, 347.2, 606, 607, 608, 608.2, 608.6, 611.2, 613, 614; 360/132

[56] References Cited

U.S. PATENT DOCUMENTS

| | | |
|---|---|---|
| 793,672 | 7/1905 | Kuckoff et al. . |
| 3,195,828 | 7/1963 | Kuckoff et al. . |
| 3,489,371 | 4/1968 | Smith . |
| 3,495,787 | 2/1970 | Wallace ................................. 242/346 |
| 3,622,099 | 11/1971 | Bishop . |
| 3,645,462 | 2/1972 | Ito et al. . |
| 3,712,559 | 1/1973 | Schwartz . |
| 3,861,621 | 1/1975 | Takeichi et al. . |
| 3,873,046 | 3/1975 | Thevenaz . |
| 3,910,692 | 10/1975 | Scibilia . |
| 3,971,071 | 7/1976 | Urayama . |
| 4,226,381 | 10/1980 | Katata ................................. 242/608.6 |
| 4,227,622 | 10/1980 | Okamura . |
| 4,235,395 | 11/1980 | Wardenaar et al. . |
| 4,249,710 | 2/1981 | Dobbs et al. ........................ 242/347.2 |
| 4,306,690 | 12/1981 | Izaki et al. . |
| 4,341,365 | 7/1982 | Oishi . |
| 4,367,963 | 1/1983 | Daughters . |
| 4,376,519 | 3/1983 | Ishida et al. . |
| 4,382,565 | 5/1983 | Shiba . |
| 4,428,481 | 1/1984 | Basili . |
| 4,473,194 | 9/1984 | Kashimura ........................... 242/608.6 |
| 4,501,396 | 2/1985 | Tomsyck . |
| 4,515,330 | 5/1985 | Wulfing et al. ....................... 242/346.2 |
| 4,520,969 | 6/1985 | Wulfing et al. ....................... 242/608.6 |
| 4,559,574 | 12/1985 | Umeda ................................ 242/345.2 |
| 4,561,609 | 12/1985 | Collins et al. . |
| 4,620,255 | 10/1986 | Cook et al. ........................... 242/346.2 |
| 4,648,563 | 3/1987 | Tollefson ............................. 242/346.2 |
| 4,707,757 | 11/1987 | Shiba et al. . |
| 4,715,558 | 12/1987 | Fair et al. ............................. 242/345.2 |
| 4,754,358 | 6/1988 | Oishi . |
| 4,932,604 | 6/1990 | Maehara et al. ....................... 242/614 |
| 4,951,167 | 8/1990 | Hiramoto et al. .................... 242/347.1 |
| 4,969,612 | 11/1990 | Thomas .............................. 242/345.2 |
| 5,092,536 | 3/1992 | Gelardi et al. ....................... 242/347.1 |
| 5,114,092 | 5/1992 | Gelardi et al. ....................... 242/345.2 |
| 5,201,476 | 4/1993 | Gelardi et al. ........................... 242/346 |
| 5,240,201 | 8/1993 | Gelardi et al. ........................... 242/343 |
| 5,308,015 | 5/1994 | Gelardi et al. ....................... 242/347.1 |
| 5,377,928 | 1/1995 | Gelardi et al. ........................... 242/346 |

FOREIGN PATENT DOCUMENTS

| | | |
|---|---|---|
| 2845238 | 4/1980 | Germany . |
| 2104872 | 3/1983 | United Kingdom ................ 242/345.2 |
| WO88/08196 | 10/1988 | WIPO . |
| WO91/07752 | 5/1991 | WIPO . |
| WO91/09401 | 6/1991 | WIPO ................................ 242/347.1 |

Primary Examiner—John P. Darling
Attorney, Agent, or Firm—Browdy and Neimark

[57] ABSTRACT

An improved video tape cassette is molded from a plastic having good elastic memory in primarily two pieces, namely a housing piece and a dust cover piece. The housing is provided with an inwardly movable latching flap which holds the dust cover in latched position, and which is backed up by an integrally molded spring. A second spring is integrally molded to the dust cover to bias it in a closed position. Rotatable guide sleeves are provided to reduce tape damage, and locking teeth keep the spools from moving when the cassette is not in a video player/recorder machine.

15 Claims, 11 Drawing Sheets

VIDEO TAPE CASSETTE

This is a continuation-in-part of parent application Ser. No. 08/120,791, filed Sep. 15, 1993, itself a continuation of application Ser. No. 07/615,116, filed Nov. 19, 1990, now abandoned.

FIELD OF INVENTION

The present invention relates to improvements in video tape cassettes.

BACKGROUND OF THE INVENTION

U.S. Pat. No. 4,367,963 issued to Daughters for a "Refillable Typewriter Ribbon Cartridge" discloses a ribbon cartridge designed to meet a set of problems in the typewriter art that are completely different from the more precise video tape cassette art. The top 40 and bottom 42 of the Daughters device are joined by hinged side 44.

In U.S. Pat. No. 4,227,622, video tape cassettes are disclosed in which the mounting of upper and lower halves to each other is carried out through fastening means. However, the screwing of the two halves is a time consuming operation in production and requiring a heavy plastic. The U.S. Pat. Nos. to Dobbs et al 4,249,710 and Wardenaar et al 4,235,395 both disclose magnetic tape cassettes wherein the cassette housing has its upper and lower portions hingedly connected to one another.

Oishi U.S. Pat. No. 4,341,365 discloses a miniaturized video tape cassette such as for a portable video system which avoids hubs with flanges normally utilized in conventional full-size video tape cassettes, by using flangeless tape winding hubs each being composed of an inner drum loosely fitted within an outer drum with torque transmitted between the drums by arms extending from the inner drum and fitting into corresponding slots in the outer drum. In addition, teeth are provided in the hub and cassette which engage to hold the tape stationary when the cassette is not in use. This cassette also uses springs which bias the hubs toward the engaged position except when the cassette is loaded into a video tape machine which causes the hubs to be lifted away from the teeth of the cassette.

The Umeda U.S. Pat. No. 4,559,574 also discloses a miniature type cassette which is capable of use in different types of equipment, and in which the cassette casing may be formed of polypropylene. This device includes a supply reel having teeth on the lower surface of its lower flange, these being capable of engaging with complimentary teeth in the cassette bottom wall.

As the video tape travels through the cassette between the two spools, it conventionally passes about one or more guide posts, e.g. the post 7 of the Ito et al U.S. Pat. No. 3,645,462 and the posts 7 and 8 of the Shiba U.S. Pat. No. 4,382,565. Also see the guide post in the cartridge of the Collins et al U.S. Pat. No. 4,561,609 and those in the Gelardi et al U.S. Pat. No. 5,092,536. These guide posts are conventionally rigid posts, although there is one prior art construction which utilizes a combination of rigid posts and rotatable sleeves, the rotatable sleeves being used on the interior of the device and rigid posts being used on the outside of the cassette but inside of the dust cover. The rigid posts, against which the tape runs as it plays, rub against the tape causing a number of negative results, including scratching and stretching of the tape, these in turn causing distortions. In addition, the rigid posts tend to wear out the tape more quickly.

The Gelardi et al U.S. Pat. No. 5,092,536 discloses an integrally molded cassette including not only top and bottom portions, but also an integral dust cover, and wherein the top and bottom portions are ultrasonically welded together. An external dust door latch or latch flap is shown for maintaining the dust cover in normally closed position. However, even though such latch flap is internally located relative to the dust cover, it is externally located relative to the cassette casing itself, and thus subject to becoming damaged as the dust cover opens and closes each time the video cassette is engaged within a player/recorder. Moreover, the simplest embodiments of the Gelardi patent rely on the integral hinges themselves to provide sufficient spring force, but in practice the spring force provided by the hinges is insufficient and additional metal springs such as illustrated in FIG. 40 of the Gelardi patent must be used. In the commercial embodiment of the Gelardi device, the latch flap 67 (FIGS. 8, 50 and 51) is not used, but instead only a metal spring is used to bias the dust cover closed, but such dust cover can be undesirably easily opened so that the video tape becomes damaged.

Other patents describing the closest subject matter provide for a number of more or less complicated features that fail to solve the problem in an efficient and economical way. All of the above-noted prior devices suffer from one or more of a number of disadvantages, primarily in the area of being unable to perform all necessary functions in the desired manner without the provision of unduly costly and complex means. The video tape also wears out too quickly in these prior devices. None of these prior patents suggest the novel features of the present invention. Thus, the need continues to exist for a fully effective and less costly video cassette with a minimum number of pieces, and which is formed entirely of plastic and without the need for additional non-integral elements such as springs of metal or plastic.

RELATED INVENTION

Parent co-pending application Ser. No. 08/120,791, filed Sep. 15, 1993, discloses a video tape cassette which is an improvement over the prior art at least insofar as concerns locking of the video tape in place against movement when the cassette is not in the player/recorder. This invention is published in international published application WO 92/09081 of 29 May 1992.

SUMMARY OF THE INVENTION

Accordingly, it is an object of the present invention to overcome deficiencies in the prior art, such as those indicated above.

It is a further object of the present invention to provide a unitary video tape cassette housing that can be readily closed after the spools have been mounted within the unfolded housing whereby the tape can be loaded to the spools without opening the housing.

It is another object of this invention to provide such a video tape cassette that uses a non-brittle material capable of withstanding substantial handling and misuse without breaking.

It is still another object of the this invention to provide a video tape cassette that eliminates all metal parts.

It is yet another object of the present invention to provide such a device that is inexpensive to manufacture and maintain while retaining its effectiveness including its compatibility with existing video recorders' mechanisms.

It is still a further object of the present invention to provide a full-size or standard-size video tape cassette that is lighter in weight than prior video tape cassettes.

It is yet a further object of the present invention to provide a video tape cassette optionally formed entirely of a single recyclable material and with a minimum number of separately molded parts.

An additional object of the present invention is to provide a video tape cassette which reduces wear on the video tape.

It is yet an additional object of the present invention to provide a video tape cassette containing two-piece reels or spools which do not require parts to be welded to one another.

Still an additional object of the present invention is to provide an improved video tape cassette provided with an internal, integral plastic spring to maintain the dust cover in closed position.

And still a further object of the present invention is to provide an improved video tape cassette having an integral latch flap for engagement by the recorder/player machine to release the dust cover, which integral latch flap is spring biased by an integral plastic spring and which does not require separately molded elements including additional springs.

These and other objects and the nature and advantages of the present invention will be more apparent from the following detailed description of certain preferred embodiments, taken in conjunction with the drawing, wherein:

BRIEF DESCRIPTION OF THE DRAWING

FIG. 7a is an enlarged partial detail view similar to FIGS. 5a and 6a showing the state of FIG. 7 with the teeth of the inner bottom surface of the cassette housing engaging and locking the teeth on the bottom surface of the spool or reel so as to prevent the spool or reel from rotating in the direction of right to left as illustrated in FIG. 7a.

DETAILED DESCRIPTION OF PREFERRED EMBODIMENTS

Figure 1:
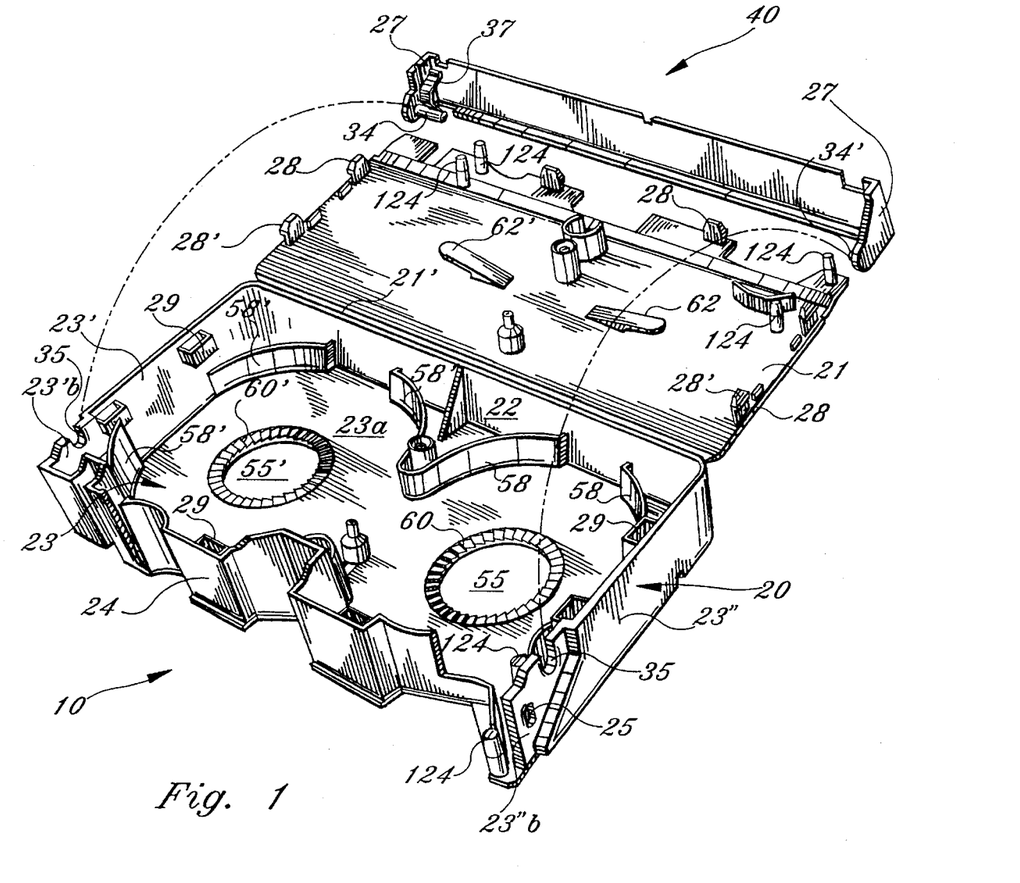
FIG. 1 is an isometric view of an embodiment of the video tape cassette incorporating the features of the present invention wherein the housing is unfolded and the tape spools removed.
Figure 2:
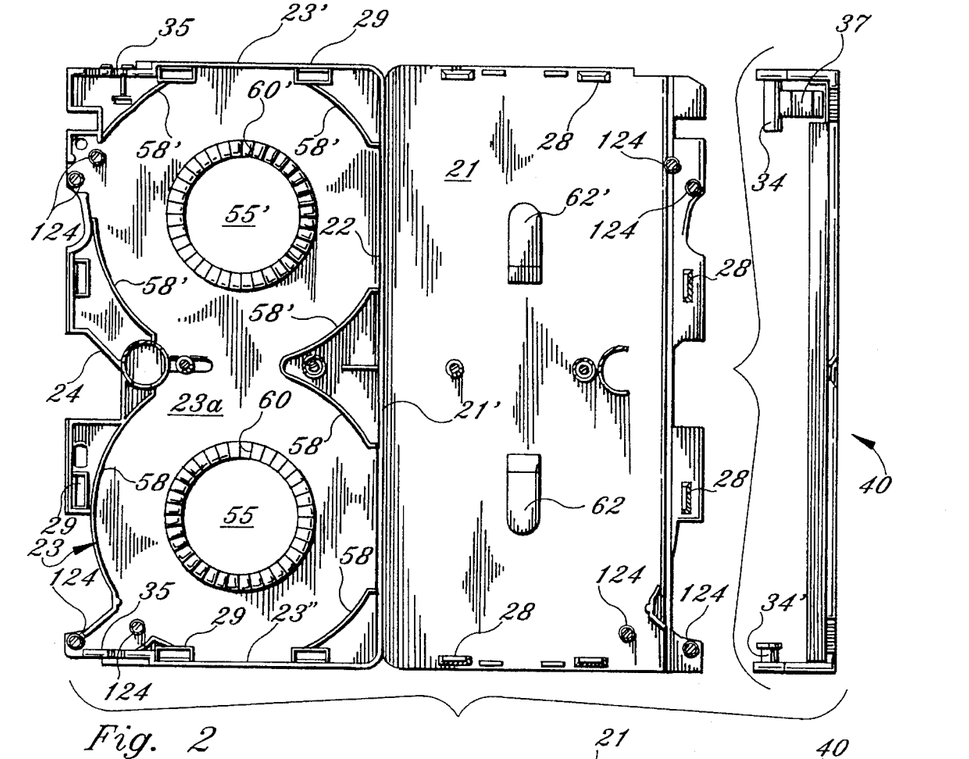
FIG. 2 is an exploded top view of the video tape cassette shown in FIG. 1.

Referring now to FIG. 1, where the present invention is generally referred to with numeral 10, it can be observed that it basically includes a substantially rectangular unitary housing 20 of a resilient plastic material that can be made thinner, at certain points, to permit its folding. One of such plastic materials having elastic memory[1] that has been found to be suitable is polypropylene, which is the material used at present for covers for the cases for video tape cassettes (library cases); other plastics having sufficient elastic memory, e.g. other propylene polymers, polyethylene, PVC, etc. can be used. Housing 20 includes upper section 21 and bottom section 23 hingedly joined along fold line 21' (thinner areas).

[1] By "elastic memory" what is meant is the ability of the plastic to return to its as-molded shape after being deformed.

Bottom section 23 includes lateral side walls 23' and 23" as well as back wall 22, all of which extend perpendicularly upwardly from side and rear edges of a bottom wall 23a. The side walls 23' and 23" each have indented portions 23'b and 23"b at the front portions thereof. A front wall 24, of irregular shape, is conformed to expose the video tape to the pick up and recording magnetic heads of the video recorder/player machine (not shown) as well as to let a conventional control beam of light through windows 25 in the indented portions 23'b and 23"b. Interior and exterior posts 124, described in more detail below, guide the tape. The housing 20 includes top and bottom sections 21 and 23 contiguously formed from the aforementioned unitary foldable material with substantial resiliency to withstand deformation, e.g. polypropylene plastic. The bottom section 23 includes two openings 55 and 55' and toothed areas 60 and 60' around their internal periphery. The top section 21 is hingedly joined to the bottom section 23 so that, when folded, the sections define a substantially rectangular space.

Figure 3:
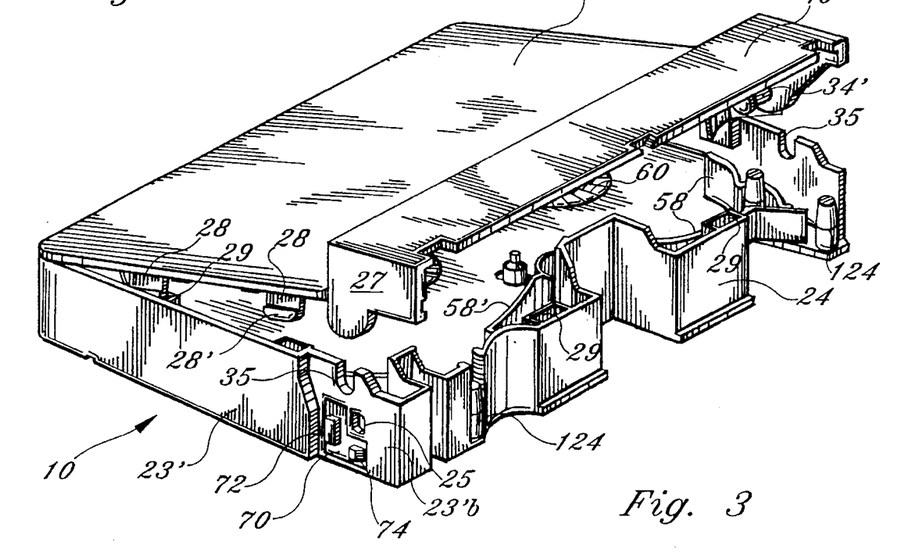
FIG. 3 illustrates the video tape cassette shown in the previous figures, in an isometric view, and about to be closed.
Figure 4:
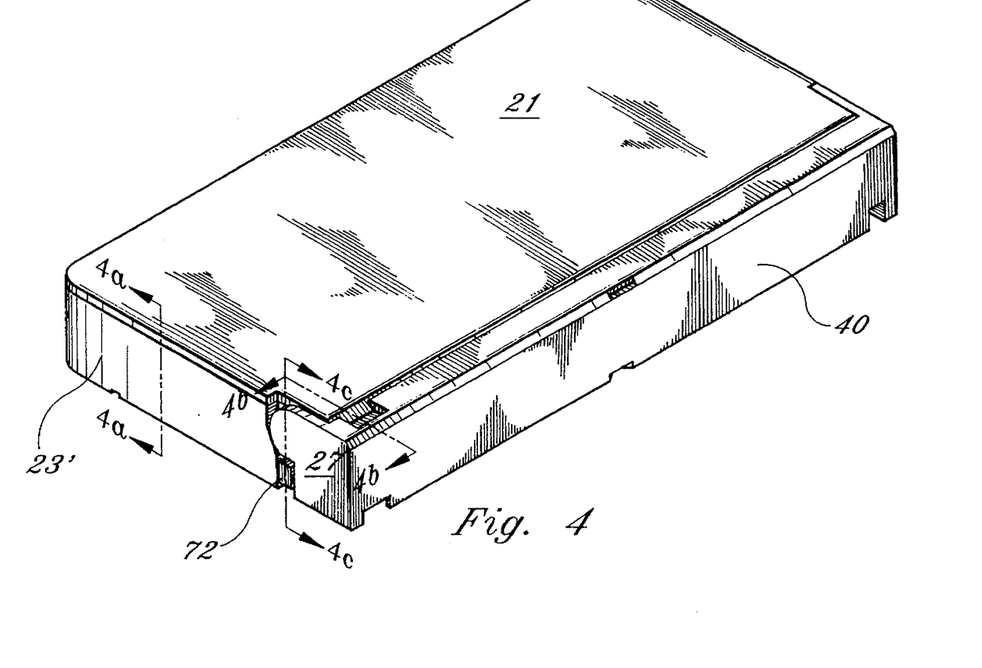
FIG. 4 is a perspective view of the video tape cassette shown in the previous figures in the closed and locked position, with the dust cover also closed.
Figure 4A:
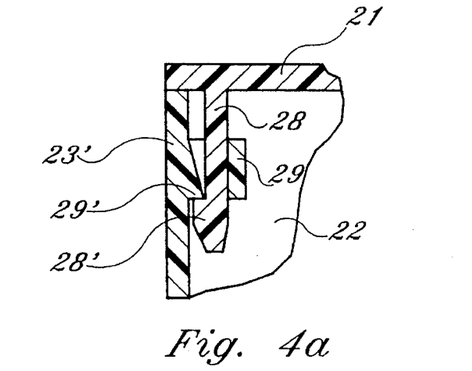
FIG. 4a is a partial sectional view taken along line 4a—4a of FIG. 4 illustrating details of a mail locking tab member engaged to a female receiving member.

As seen in FIGS. 1, 2, 3 and 4a, when the housing 20 is closed by folding the cover or upper section 21 along the hinge line 21' over the lower section 23 of the housing 20, male locking tab members 28 having heads 28' are inserted through female receiving members 29 thereby firmly locking the upper section 21 to lower section 23 by virtue of the cooperative spring bias of male locking tab member 28 that urges its head 28' outwardly after it cammingly passes through its cooperative female receiving member 29. After being inserted through female receiving members 29, male locking tab members 28 cannot be separated since head 28' prevents it, as best shown in FIG. 4a, the head 28' being interlocked with a projection 29' in the wall 23', 23", 24.

Figure 3A:
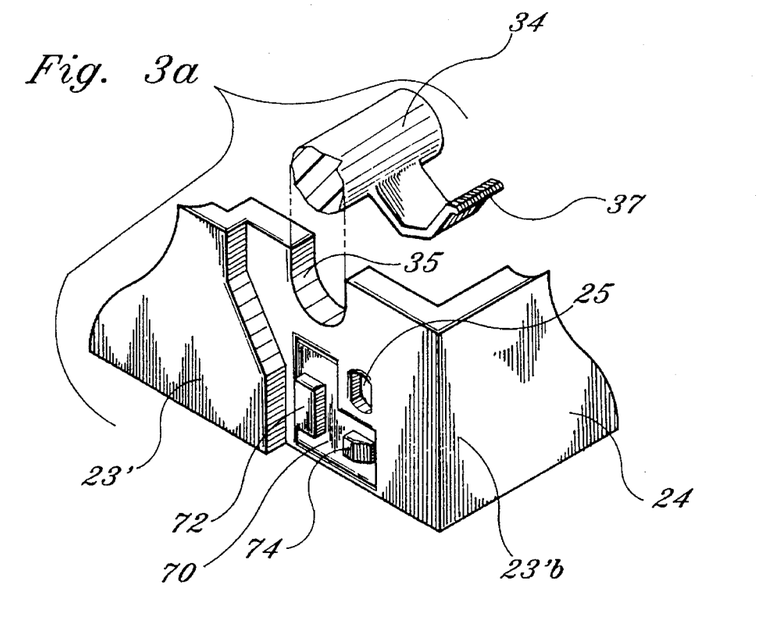
FIG. 3a is an enlarged view, partly broken away, of a corner of the video tape cassette as illustrated in FIG. 3.
Figure 3B:
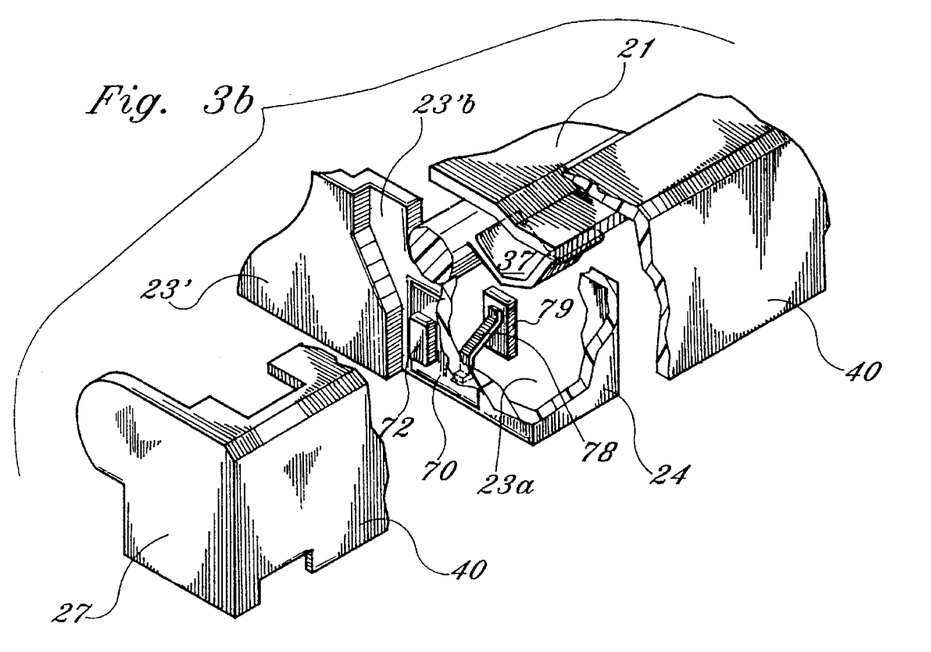
FIG. 3b is an exploded and partially broken away view of the same corner shown in FIG. 3a, showing the arrangement of the parts with the dust cover closed.
Figure 4B:
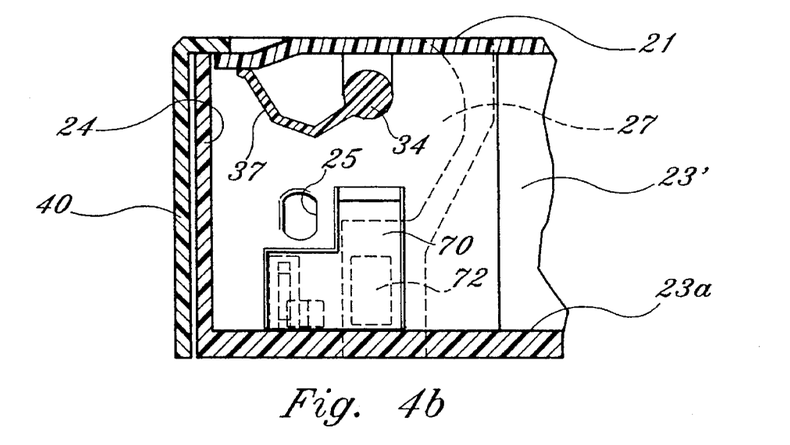
FIG. 4b is a partial cross-sectional view taken along line 4b—4b of FIG. 4 showing characteristics of the dust cover locking and biasing mechanism in the closed position.

The video cassette 10 also includes a separate dust cover 40 which is pivotally connected to the front of the housing 20 so as to cover and protect a short section of video tape (not shown) between the two reels and which lies on the outside of the irregularly shaped front wall 24 of the bottom section 23 of the housing 20. Suitable means, described in detail below, are provided for holding the dust cover 40 in proper position so that it will be pivotally retained over the front wall 24 of the housing 20 without becoming dislodged, while at the same time being capable of pivoting out of the way when the video tape cassette is inserted into a player/recorder machine; and another suitable means, also described below, is provided to spring bias the dust cover 40 into a closed position as illustrated in FIGS. 3b, 4 and 4b. Very briefly, however, the dust cover is provided with a pair of inwardly projecting protuberances or shafts 34 and 34' which, when the housing 20 is closed, rest in U-shaped aperture grooves 35 in the indented portions 23'b and 23"b of the sidewalls 23' and 23" of the housing bottom section 23, and thus the shafts or protuberances 34 and 34' constitute co-axial pivot axes about which the dust cover 40 rotates between open and closed positions.

Connected to the shaft or protrusion 34, itself integral and unitary with the dust cover 40, is an integral spring flange 37, preferably of generally U-shape as illustrated, although other shapes are possible. With particular reference to FIGS. 3, 3a and 3b, as well as FIGS. 4b and 4d, it will be understood that the spring flange 37, having good elastic memory, will abut against a portion of the inside of the cover or upper section 21, although it will be understood that depending on the shape of the spring flange 37, the abutment surface can be flat as shown, or may be configured for example in the shape of a downwardly projecting flange.

FIG. 3 shows an assembly state immediately prior to closing the housing by driving the male members 28 into locking engagement with the female members 29, which also results in the dust cover 40 being rotatably locked in place by trapping the shafts 34 and 34' in the U-shaped grooves 35 and with the cover 21 of the housing 20 then preventing escape of the shafts 34 and 34' from the U-shaped grooves 35 (see FIGS. 3b and 4b). In the closed position as shown in FIG. 4, the front inside part of the cover 21 projects against and springingly deforms the integral spring flange 37 minimally applying torque to the shafts 34 and maintaining the dust cover 40 in closed position as best illustrated in FIGS. 3b and 4b. This construction provides a significant advantage over the Gelardi et al U.S. Pat. No. 5,092,536 which either relies on the inherent spring capability of the hinge 21 which is insufficient, or requires the use of an additional spring (FIG. 40); in actual commercial practice, the Gelardi device uses an added metal spring, as the memory of the hinge itself is apparently inadequate.

As is typical the dust cover 40 has rearwardly extending sidewalls 27, and it is these sidewalls 27 from which the shafts 34 and 34' respectively extend inwardly. When the dust cover is closed by rotation about the axis of the shafts 34 and 34' to the position illustrated in FIG. 4, the rearwardly extending sidewalls 27 of the dust cover 40 extend along and interfit within the indented portions 23'b and 23"b over windows 25 at both ends of the front portion of the cassette housing 20. When the video tape cassette 10 is placed in the video player/recorder machine, elements of the machine unlock and then force the dust cover 40 to rotate about the axis of the shafts 34 and 34' against the biasing action of the integral spring flange 37 so as to open the dust cover 40 and uncover the windows 25, noting FIGS. 4b and 4d. As seen in FIG. 4d, the spring flange 37 becomes substantially flattened in its deformed condition.

Reverting now back to FIGS. 3, 3a, 3b and 4c, it will be seen that the front part 23'b of the wall 23' of the cassette housing 20 has an L-shaped locking or latching flap 70 integrally hinged at its upper end to the wall part 23'b so as to be pivotable inwardly of the housing, and carrying two outwardly directed protuberances 72 and 74. The first of these protuberances 72 is merely a thickened portion on the locking flap 70 for receiving an element from the recorder/player machine, which element (not shown) pushes the hinged latching flap 70 inwardly to unlock the dust cover 40 so it can then be rotated against the action of the integral spring flange 37 to open or uncover the windows 25. With reference to FIG. 4, it will be seen that the sidewall 27 of the dust cover 40 does not cover the protrusion 72, and it is therefore accessible to the machine element. The second protrusion 74 is a locking projection which fits within a complementary recess 75 (FIG. 4d) on the inside of the sidewall 27 of the dust cover 40.

Figure 4C:
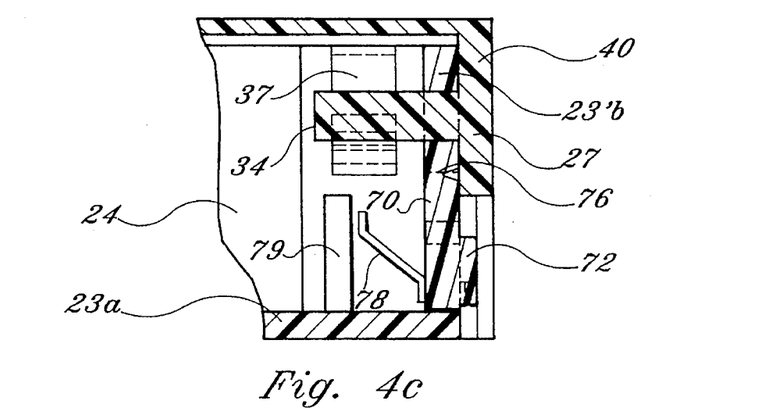
FIG. 4c is a partial cross-sectional view taken along line 4c—4c of FIG. 4 illustrating an embodiment of the latching flap and its integral spring biasing member.
Figure 4D:
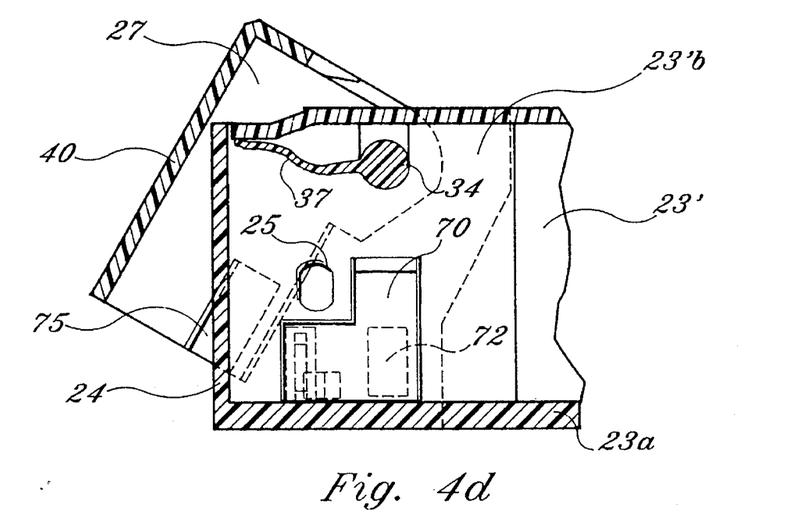
FIG. 4d is a view similar to FIG. 4b, but showing the dust cover partly open.

The locking or latching flap 70 is integral with the housing 20 of the cassette 10 and has an integral hinge provided by a thinned portion 76 as best seen in FIG. 4c. As the spring action provided by the hinge 76 is insufficient by itself to ensure that the latching flap 70 remains in its desired vertical locking position to interengage the locking projection 74 with the recess 75 and thus lock the dust cover 40 in place when the video cassette 10 is not in the machine, a supplemental integral spring flange 78 is provided behind the latching flap 70 FIG. 4c shows a preferred embodiment wherein the spring flange 78 is integrally molded onto the back surface of the latching flap 70 itself, and a vertical wall or abutment flange 79 is provided extending upwardly from the bottom wall 23a of the housing 20 against which the spring flange 78 springingly abuts when the locking flap 70 is pushed open by the video player/recorder machine. Alternatively (not shown), the spring flange 78 can be integrally molded to the bottom wall 23a with its free end positioned adjacent the back of the locking flap 70.

It will be noted that unlike the proposed constructions of the Gelardi U.S. Pat. No. 5,092,536 in its FIGS. 8, 50 and 51, the latching flap 70 in the present invention is maintained in a protected position substantially within the confines of the housing 20 rather than outside as in the disclosed Gelardi embodiments. It may be added that the commercial embodiment of the Gelardi device does not use any latching flap, let alone an integral latching flap, but instead uses a metal spring to bias the dust cover closed without any latching.

As is conventional, the housing 20 comprises appropriate curved guide walls 58 and 58' which project upwardly from the bottom wall 23a of the bottom section 23 of the housing 20, and these walls. 58 and 58' help to keep flanged spool members carrying the video tape in place. In the present invention, spring leaves 62 and 62' for biasing the spools downwardly are molded integrally with the upper section 21 of the housing 20 thereby eliminating the need for secondary molding and installation operations.

In accordance with standard industry practice and therefore to be found in all video tape cassettes, one spool is driven during playing/recording and the other spool is driven during rewinding. Looking at FIG. 1, the spool which sits above the opening 55' (upper left in FIG. 1) contained within the guide walls 58' will always be the driven spool in the recording/playing modes, whereas in these modes the spool to the lower right above the opening 55 and contained by the guide walls 58 will always be the non-driven spool, consistent with industry requirements. To the contrary, during the rewinding mode the spool above the opening 55 will be the driven spool whereas the spool above the opening 55' will be the non-driven spool.

Figure 5:
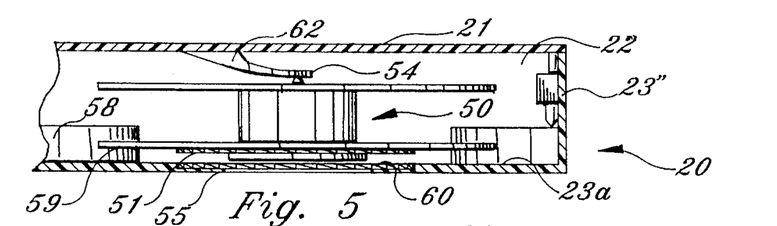
FIG. 5 is a partial cross-sectional view of the video cassette housing shown in the previous figures, with a spool being shown as it would appear when engaged with a drive shaft of the video recorder/player.
Figure 8:
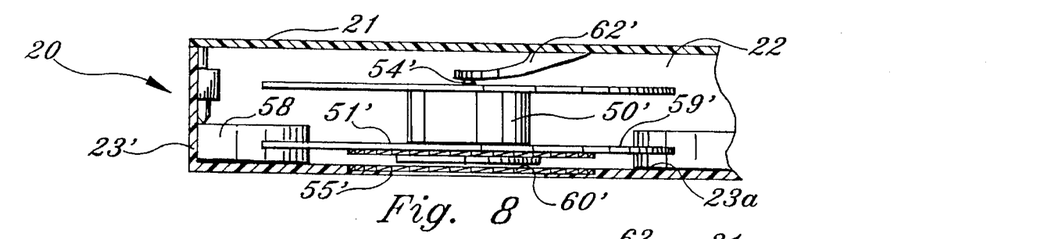
FIGS. 8–10 and 8a to 10a are views similar to FIGS. 5–6 and 5a to 7a as described above, but showing the opposite spool and its relative positions of engagement and disengagement with the teeth on the bottom inside wall of the video cassette housing.

In FIGS. 5 and 8, the video tape cassette, without the tape wound on a spool, can be seen inside the video recorder/player. In this mode, the drive shaft (not shown) of the video recorder/player projects through the openings 55 or 55' lifting the respective spool 50 or 50' within the cassette, and disengaging the toothed areas 51 and 51' on the undersides of flanges 59 and 59' of the spool 50 or 50' from the toothed areas 60 and 60' on the inner surface of bottom wall 23a of the housing 20 around opening 55 and 55'.

The integrally molded spring leaf 62 is shown in contact with an axial protrusion 54 of flanged spool member 50. The drive shaft (not shown) of the video recorder/player machine urges the flanged spool member 50 upwardly against the downward spring bias of the spring leaf 62. The same situation exists for the other spool 50' as shown in FIG. 8. When the drive shaft beneath the spool 50 extends upwardly through the opening 55 to engage the spool 50 as illustrated in FIG. 5, it will drive the spool 50 counterclockwise as viewed from above (e.g. FIGS. 1 or 2) to effect rewinding; and when the other shaft extending upwardly through the opening 55' is the drive shaft, the spool 50' (see FIG. 8) will be driven for playing or for recording.

Figure 6:
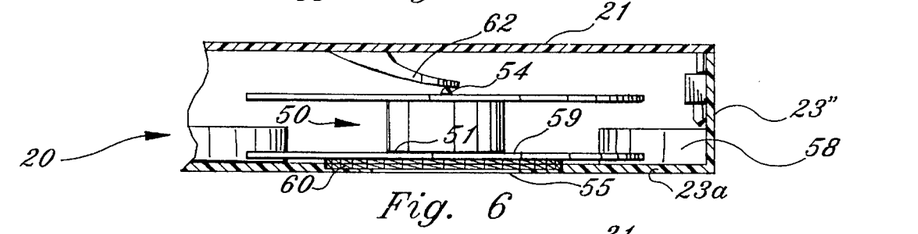
FIG. 6 is a partial cross-sectional view similar to FIG. 5 at an intermediate stage where the drive shaft of the video recorder/player has not entirely disengaged the bottom of the spool and the spool is being spring biased to come into contact with the floor of the video cassette housing.
Figure 6A:
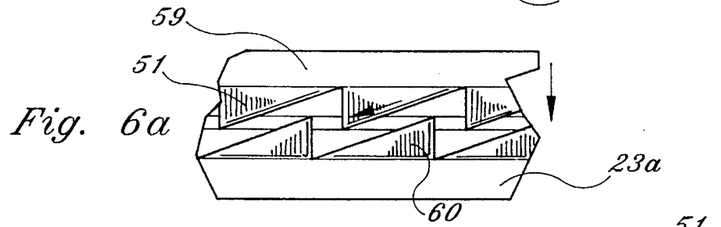
FIG. 6a is an enlarged detail similar to FIG. 5a showing the intermediate position of FIG. 6.
Figure 9:
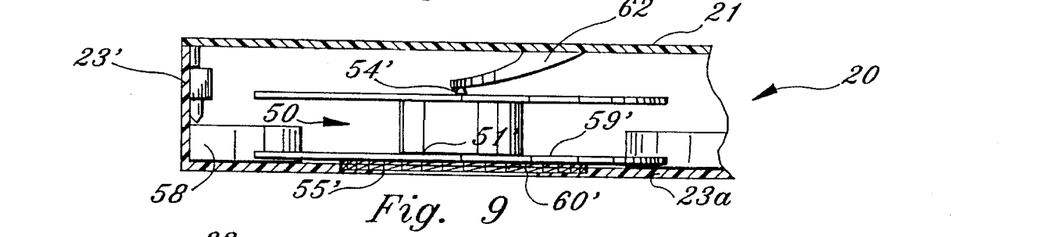
Figure 9A:
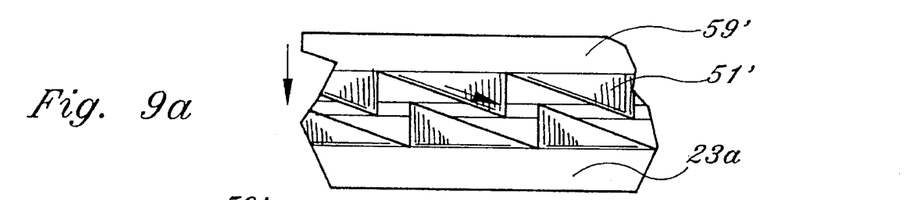
Figure 10:
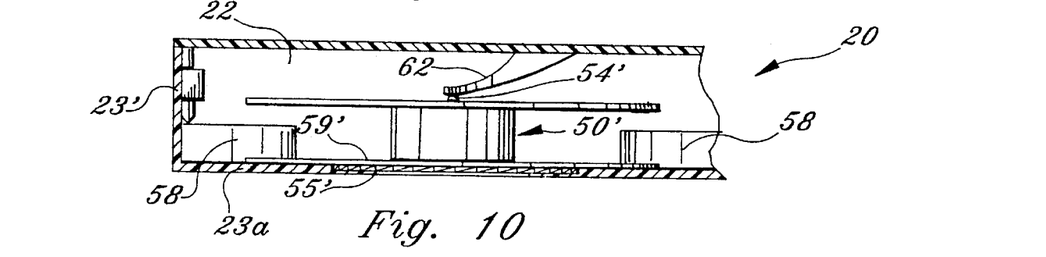
Figure 10A:
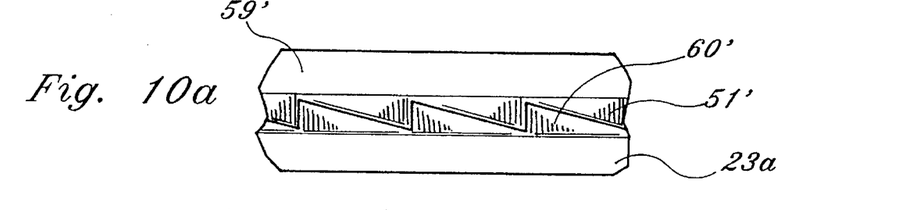

FIGS. 6 and 6a, and FIGS. 8 and 8a as well, show what happens when the video tape cassette is removed from the machine, i.e. as the machine shafts begin to be withdrawn through the openings 55 and 55'. In this mode, the force of the machine shafts no longer serve to maintain the spools 50 and 50' in an upper position, so the respective spring leaves 62 and 62' begin to drive the spools 50 and 50' downwardly so that the teeth 51 and 60, and the teeth 51' and 60', begin to mate as best shown in FIGS. 6a and 9a. If the teeth 51 and 60, and the teeth 51' and 60', are not exactly aligned, as shown in FIGS. 6a and 9a, their complimentary shapes will cause a slight amount of rotation of the flanges 59 and 59' so that, when the cassette is fully withdrawn from the machine, the teeth are fully aligned as shown in FIGS. 7a and 10a, and the spools 50 and 50' are locked against unwinding.

Figure 5A:
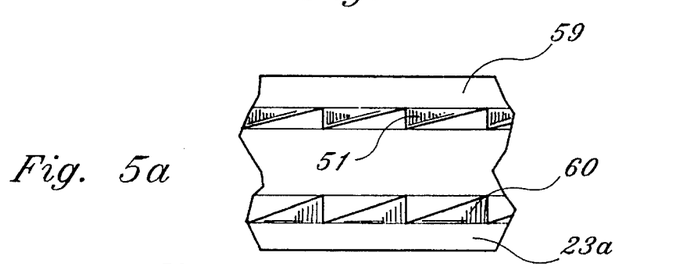
FIG. 5a is a broken away enlarged detail view of the engageable teeth of the inner surface of the cassette housing and the bottom surface of the spool member in an unengaged position as illustrated in FIG. 5.
Figure 7A:
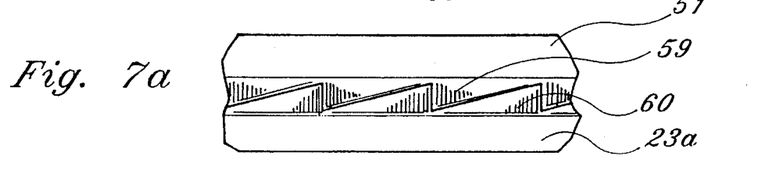
Figure 8A:
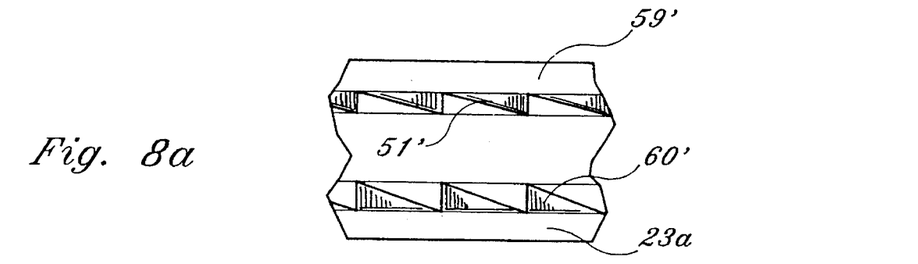

Thus, FIGS. 5a and 8a show in more detail the separation of the spools 50 and 50' respectively carrying teeth 51 and 51' on their undersides, separated away from the respective tooth areas 60 and 60' when the shafts of the machine are engaged with the undersides of the spools 50 and 50' or just begin to be disengaged or re-engaged. On the other hand, FIGS. 7a and 10a show the mode when the video tape cassette 10 is no longer in the video player/recorder machine and the toothed areas are fully engaged.

Figure 7:
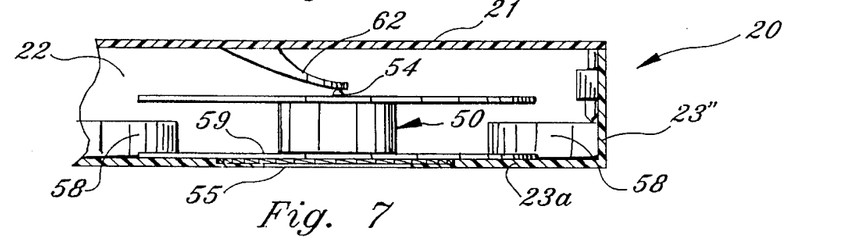
FIG. 7 is a partial cross-sectional view similar to FIGS. 5 and 6 wherein the spool has become entirely disengaged from the drive shaft of the video recorder/player and is engaged with an anti-slip ratchet or locking mechanism on the bottom surface of the cassette housing.
Figure 14A:
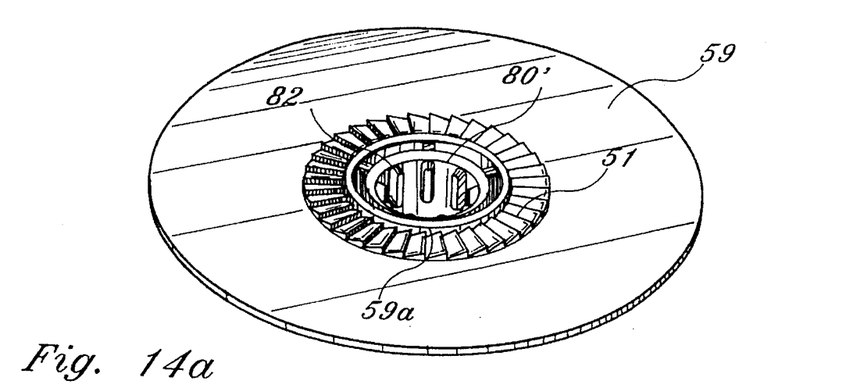
FIGS. 14a and 14b are perspective views from the bottom of the spool elements illustrated in FIG. 11 and showing the oppositely inclined teeth per FIGS. 5a and 8a, these teeth being inclined in opposite directions.
Figure 14B:
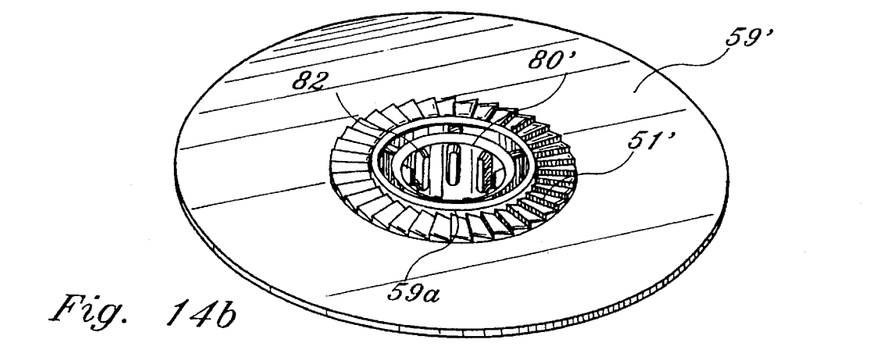

In FIGS. 7 and 7a, flanged spool member 50 is seen engaged to the toothed area 60 since the rewinding drive shaft (not shown) of the video recorder/player is retracted from the cassette 20 and is not engaged with it. Spring leaf 62 urges flanged spool member 50 to engage with toothed area 60 preventing it from rotating while not in use. A view in detail is shown in FIG. 7a wherein the teeth engagement is shown when the cassette is out of the video recorder/player. In this manner, the aforementioned spool locking is implemented with the engagement of toothed area 51 on the bottom of the flange 59 of flanged spool 50 and teeth 60 surrounding the opening 55. This locking mechanism prevents the tape from unwinding in the tape playing/recording direction when the cassette is not engaged to the shaft of the video recorder/player. Similarly, looking at FIGS. 10 and 10a, wherein the teeth 51' and 60' are inclined in the opposite direction (see also FIGS. 14a and 14b), the tape is also locked in the opposite direction, i.e. from unwinding in the tape rewinding direction.

In more detail, and as can best be seen from FIG. 1, the teeth 60 surrounding the opening 55 beneath the spool 50 which is usually the non-driven spool, i.e. the non-driven spool during recording and playing, each have a vertical edge and an edge which is inclined upwardly in a counterclockwise direction when viewed from above. Consequently, when the video recorder/player drive shaft is not extending through the opening 55, i.e. the condition shown in FIGS. 7 and 7a, the normally non-driven spool 50 is locked into place so as to prevent the spool from moving in the clockwise direction, i.e. the tape winding direction for recording/playing.

Similarly, the teeth 60' surrounding the opening 55' beneath the spool 50', usually the driven spool, each have a vertical edge and an edge which is inclined upwardly in the clockwise direction when viewed from above. Consequently, when a drive shaft of the video recorder/player is not extending through the opening 55', i.e. when the video cassette is not in the machine and the condition is that shown in FIGS. 10 and 10', the normally driven spool 50' is locked into place so as to prevent the spool from moving in the counterclockwise direction.

The spools 50 and 50' according to the present invention are shown in FIGS. 11 through 18. As these two spools 50 and 50' are identical except for the direction of inclination of the toothed areas 60 and 60' on the bottom surfaces of their bottom flanges, which inclinations are opposite to one another as described above, the description below will be understood to apply not only to the spool 50, but also the spool 50'.

Figure 11:
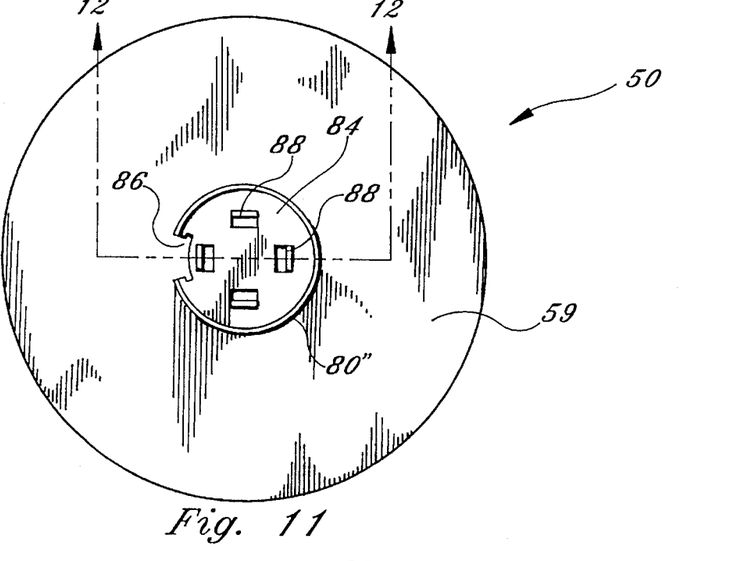
FIG. 11 is a top plan view of a bottom part including bottom flange of a spool or reel for use in the video cassette of the present invention and for supporting the video tape.
Figure 12:
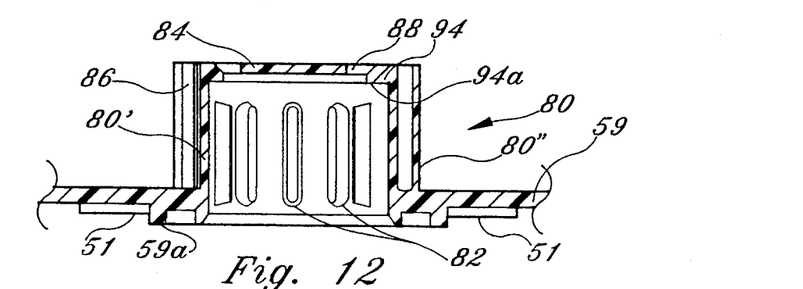
FIG. 12 is a partial sectional view taken along line 12—12 of FIG. 11.
Figure 18:
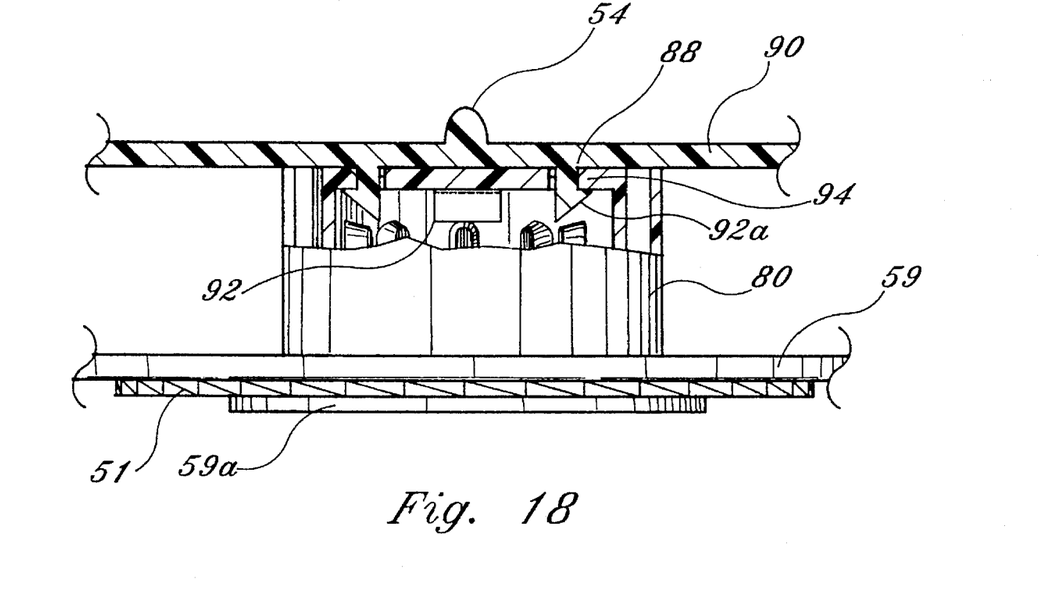
FIG. 18 is an enlarged detail, partly in section and partly broken away, of the interengaged first and second spool elements.

With reference to FIG. 11, the spool 50 comprises a bottom flange 59 as already partly described above and an upstanding hub 80 having an outer circular sidewall 80", an enlarged partial sectional view of which is shown in FIG. 12. As best seen in FIGS. 12 and 18, the sidewall of the hub 80 is in the form of double circular walls including an inner portion 80' and an outer portion 80" defining an annular space therebetween. As is conventional, a circular guide 59a projects downwardly from the bottom of the bottom flange 59 and, in use, fits within the opening 55.

Figure 13:
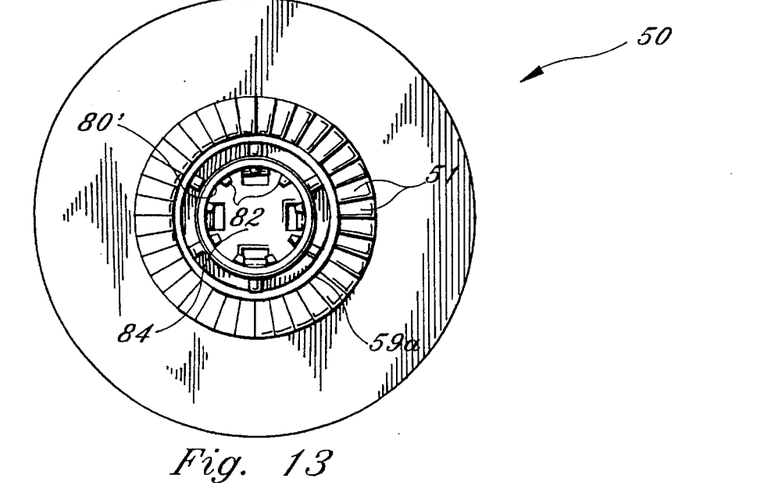
FIG. 13 is a bottom plan view of the spool element of FIG. 11.

FIG. 13 is a bottom plan view of the bottom flange 59 showing the locking teeth 51 and conventional spool driving teeth 82 which are disposed along the inner periphery of the hub 80. As best seen in FIG. 12, the bottom flange 59 and the hub 80 are integrally molded as a single unit, with the hub 80 having generally the shape of an inverted cup with an upper wall 84. The hub 80 also is provided in a conventional way with an appropriate side recess 86 (see FIG. 11) for affixing an inner end of the video tape to the hub 80, as well as a plurality of openings or slots 88 which extend through the top wall 84. Within the hub 80 and just below the latching slots 88 are inward projections 94 defining latching shoulders or ledges 94a.

Figure 15:
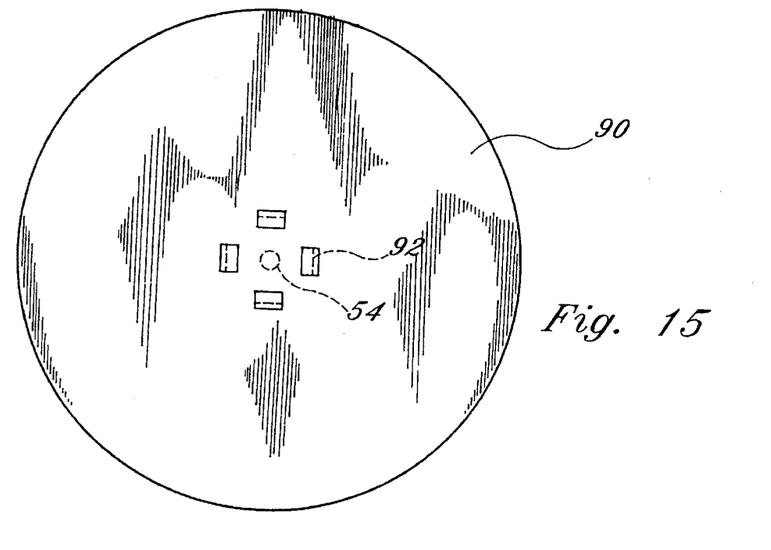
FIG. 15 is a top plan view of a second spool element in the form of an upper flange for the spool or reel for mating engagement with the first spool element of FIG. 11.
Figure 16:
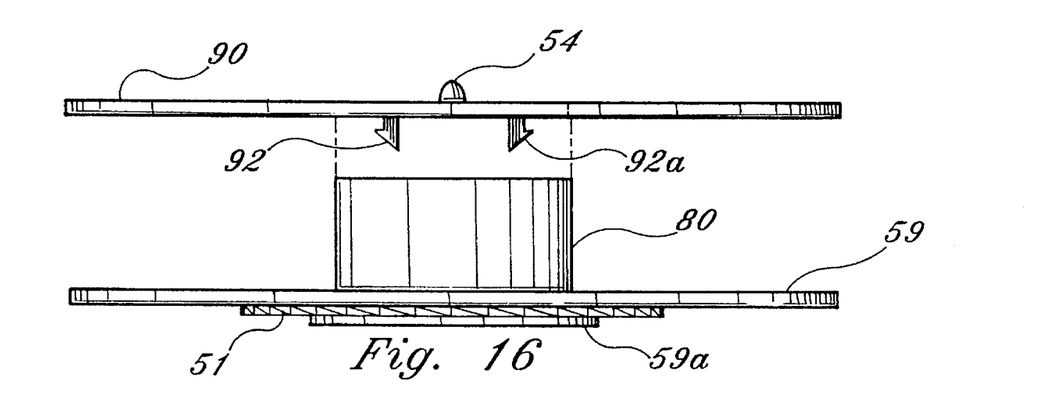
FIG. 16 is an exploded view illustrating the connection between the first and second spool elements.
Figure 17:
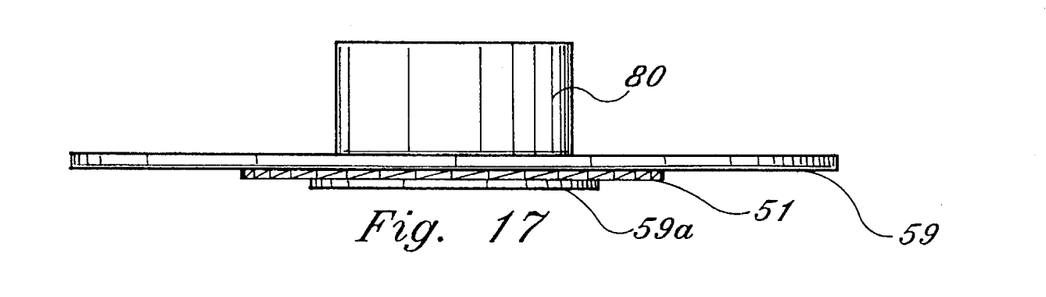
FIG. 17 is an elevational view of the first spool element as illustrated in FIG. 11.

FIG. 15 shows a top flange 90 for the spool or reel 50, this top flange being shown in more detail in FIGS. 16 and 18. The top flange 90 is provided on its upper surface with the projection 54. It also comprises a series of downwardly depending latching projections 92, each having a latching head 92a, for projecting downwardly through the latching openings or slots 88 in the upper wall 84 of the hub 80 in order to interlock the top flange 90 with the hub 80. As best seen in FIG. 18, the latching heads 92a each snap into and thus interlock with a respective shoulder 94a of the projection 94, these cooperative elements thus constituting snap fasteners. This construction avoids the need for ultrasonic welding which is conventionally used in the manufacture of the spools, and provides a sturdy and less expensive construction.

Figure 19:
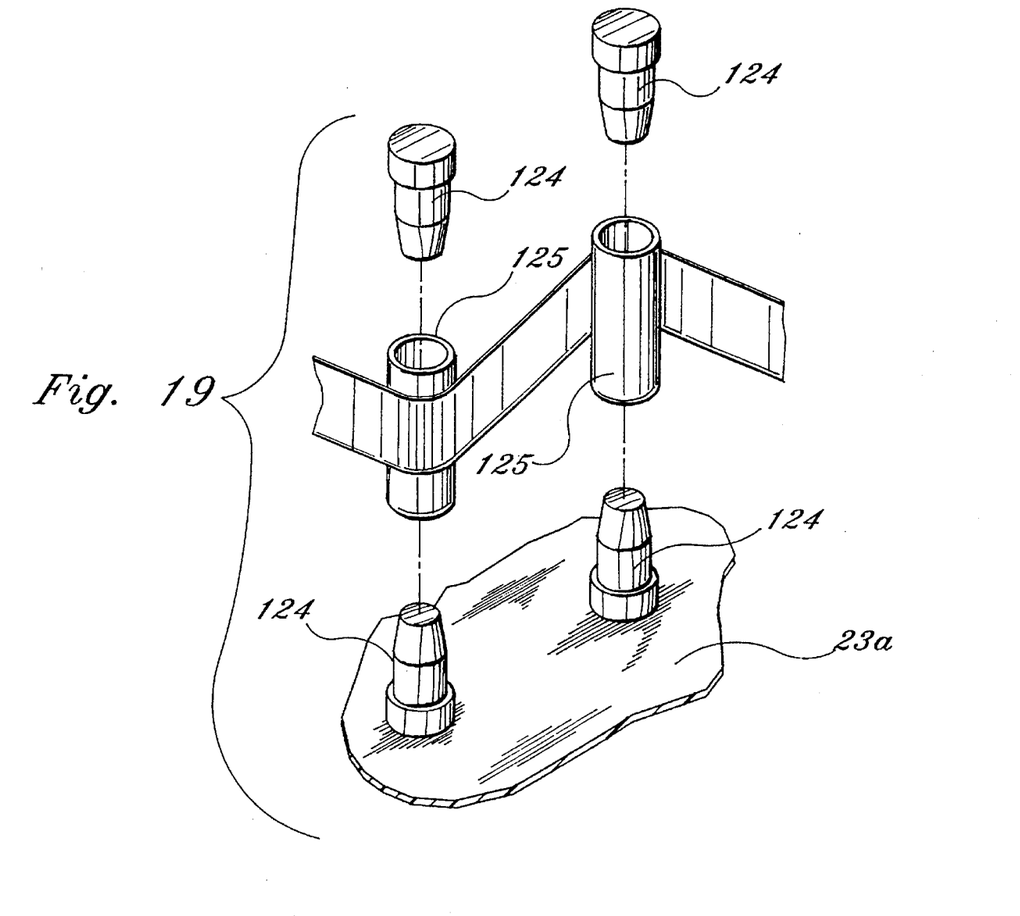
FIG. 19 is a detailed exploded view showing an improved construction for tape guiding posts in accordance with the present invention.

FIG. 19 discloses an improved arrangement for the tape guides in accordance with the present invention. Video tape cassettes of the prior art, e.g. see the aforementioned Gelardi U.S. Pat. No. '536, use stationary posts against which the tape slides with the result that the video tape rubs against such stationary posts and as a result stretches, becomes scratched, and wears out more quickly than would be desirable; stretching and scratching cause image and sound distortions, commonly called "drops" or "dropouts". In accordance with the present invention separate loose cylindrical sleeves 125 are trapped between all four sets of upper and lower tape guiding and support posts 124 when the video tape cassette housing is closed.

The cylindrical sleeves 125 each have an internal diameter which is slightly greater than the external diameter of the tape guiding posts 124, so these sleeves 125 are free to rotate about the posts 124 which serve as support axles. The rotatable cylindrical sleeves 125 are desirably formed of a rigid and strong plastic, preferably a plastic which has a relatively low friction surface, and most preferably an acetal (polyoxymethylene) resin such as Delrin™, Celcon™ or Duracon™. By the use of posts such as shown in FIG. 19, the life of the video tape is increased 2X to 3X, and the DPM rate (drops per minute) is substantially reduced.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a video tape cassette for use in conjunction with a video cassette player machine, comprising a housing formed of plastic and including top and bottom sections for enclosing a pair of rotatable video tape-holding spools, and a dust-cover rotatably attached to said housing at a front portion thereof, said dust-cover being biased in a closed position and being rotatable into an open position when placed in a video player/recorder machine, the improvement wherein said housing comprises a pair of opposite side walls (23', 23"), at least one of said side walls (23') having an indented portion (23'b) at the front portion of said video tape cassette, said dust-cover (40) having a side wall (27) which lies adjacent said indented portion (23'b) when said dust-cover is closed, said video tape cassette further comprising a latching flap (70) disposed in and unitary and integral with said indented portion (23'b) of said side wall (23'), said latching flap (70) being integrally hinged at its upper end so as to be pivotable inwardly of said housing about its integral hinge and carrying a latching projection (74) on its exterior surface, and said dust cover side wall (27) having a latching recess (75) on its interior surface for mating with said latching projection (74) when said dust cover is closed.

2. A video tape cassette according to claim 1 further comprising spring means for biasing said latching flap (70) in closed position, said spring means comprising a spring flange (78) having a proximal end integrally molded and unitary with said housing and an unattached distal end.

3. A video tape cassette according to claim 2 wherein said spring flange (78) is integral and unitary with said latching flap (70) at its proximal end, said video tape cassette further comprising an abutment flange (79) integral and unitary with and extending from a bottom wall of said bottom section of said housing, said distal unattached end of said spring flange (78) being positioned adjacent said abutment flange (79) so that upon opening of said latching flap (70) to disengage said latching projection (74) from its mating recess (75) to permit opening of said dust-cover (40), said spring flange (78) becomes deformed against said abutment flange (79) so that its elastic memory biases said latching flap (70) back to its closed position.

4. A video tape cassette according to claim 1, said video tape cassette being a standard-size cassette and further comprising:

a first opening (55') and a second opening (55) in said bottom wall (23a), said first opening (55') being for a first spool which is driven during playing and recording of the video tape and said second opening (55) being for a second spool; a saw-toothed area around the internal periphery of said second opening (55) formed of teeth each having a vertical edge and an edge which is inclined upwardly in a counter-clockwise direction when viewed from above; and a saw-toothed area (60') around the internal periphery of said first opening (55') formed of teeth each having a vertical edge and an edge which is inclined upwardly in a clockwise direction when viewed from above.

5. A video tape cassette according to claim 1 further comprising a plurality of exterior tape guides, each said exterior guide comprising a rotatable tubular sleeve, and support post means for holding said tubular sleeve in place while permitting said tubular sleeve to rotate as video tape moves between the pair of rotatable video tape-holding spools.

6. A video tape cassette in accordance with claim 5 wherein said support post means comprises a pair of coaxial posts (124), one said post being integral with and extending downwardly from said top section and the other being integral with and extending upwardly from said bottom section.

7. A video tape cassette according to claim 1 containing said pair of rotatable video tape-holding spools, at least one of said spools comprising a first part including a lower flange (59) and a hub (80) extending upwardly therefrom, and a second part comprising an upper flange (90), said lower part and said upper part being connected by snap fasteners.

8. A video tape cassette according to claim 1 wherein said plastic is a propylene polymer.

9. A video tape cassette according to claim 1, further comprising spring means integrally molded of plastic having elastic memory and unitary with said dust-cover for biasing said dust-cover in said closed position, said spring means comprising an elongated spring-flange (37) having a distal end and a proximal end, said proximal end being connected to and integral with said dust-cover (40), and said distal end being unconnected and abuttable against an internal portion of said cover, whereby upon opening of said dust-cover said spring flange becomes deformed.

10. A video tape cassette according to claim 9 wherein said dust-cover (40) is non-integral with said housing, said dust-cover having a pair of coaxial shafts (34, 34') projecting inwardly from opposite ends thereof, said coaxial shafts (34, 34') being rotatably contained within corresponding apertures (35) in said housing when said housing is closed, and wherein the proximal end of said spring flange (37) is integral with one (34) of said shafts (34, 34').

11. A video tape cassette according to claim 10, wherein said spring flange (37) is generally U-shaped in its undeformed condition and becomes substantially flattened in its deformed condition.

12. A vide tape cassette according to claim 1 wherein said latching flap (70) is L-shaped.

13. In a videotape cassette for use in conjunction with a videocassette player machine, comprising a housing formed of propylene polymer plastic and including top and bottom sections for enclosing a pair of rotatable video tape-holding spools, and a dust-cover rotatably attached to said housing at a front portion thereof, said dust-cover being biased in a closed position and being rotatable into an open position when placed in a video player/recorder machine, the improvement wherein said housing further comprises a first opening (55') and a second opening (55) in said bottom wall (23*a*), said first opening (55') being for a first spool which is driven during playing and recording of the video tape and said second opening (55) being for a second spool; a sawtoothed area around the internal periphery of said second opening (55) formed of teeth each having a vertical edge and an edge which is inclined upwardly in a counter-clockwise direction when viewed from above; and a saw-toothed area (60') around the internal periphery of said first opening (55') formed of teeth each having a vertical edge and an edge which is inclined upwardly in a clockwise direction when viewed from above;

wherein said dust-cover (40) is non-integral with said housing, said dust-cover having a pair of coaxial shafts (34, 34') projecting inwardly from opposite ends thereof, said coaxial Shafts (34, 34') being rotatably contained within corresponding apertures (35) in said housing when said housing is closed, and a spring flange (37) having a proximal end integral with one of said shafts (34, 34');

wherein said spring flange (37) is generally U-shaped in its undeformed condition and becomes substantially flattened in its deformed condition.

14. A video tape cassette according to claim 13 further comprising a plurality of exterior tape guides, at least one of said exterior guides comprising a rotatable tubular sleeve, and support post means for holding said tubular sleeve in place while permitting said tubular sleeve to rotate as video tape moves between the pair of rotatable video tape-holding spools.

15. A video tape cassette according to claim 14 containing said pair of rotatable video tape-holding spools, at least one of said spools comprising a first part including a lower flange (59) and a hub (80) extending upwardly therefrom, and a second part comprising an upper flange (90), said lower part and said upper part being connected by snap fasteners.

\* \* \* \* \*